United States Patent Office 3,045,793
Patented July 24, 1962

3,045,793
FORCE MEASURING DEVICE
Klaus Johannes Ylinen, Frejgatan 13, Stockholm, Sweden
Filed Apr. 11, 1960, Ser. No. 21,205
3 Claims. (Cl. 194—6)

This invention relates to a force measuring device of the kind which can easily be placed on more or less public places such as amusement palaces, railway stations, hotels and so on, and which there makes it possible to measure persons' handpower on payment of a small charge.

A force measuring device according to the invention is characterized by a spring actuated lever-arrangement, counteracting an aplied hand-power, and a spring set actuated by said lever-arrangement, the springs of said spring set successively actuating each other on increasing hand-power and being connected to individual marking organs which thus indicate the applied hand-power within some fixed intervals.

Figure 1:
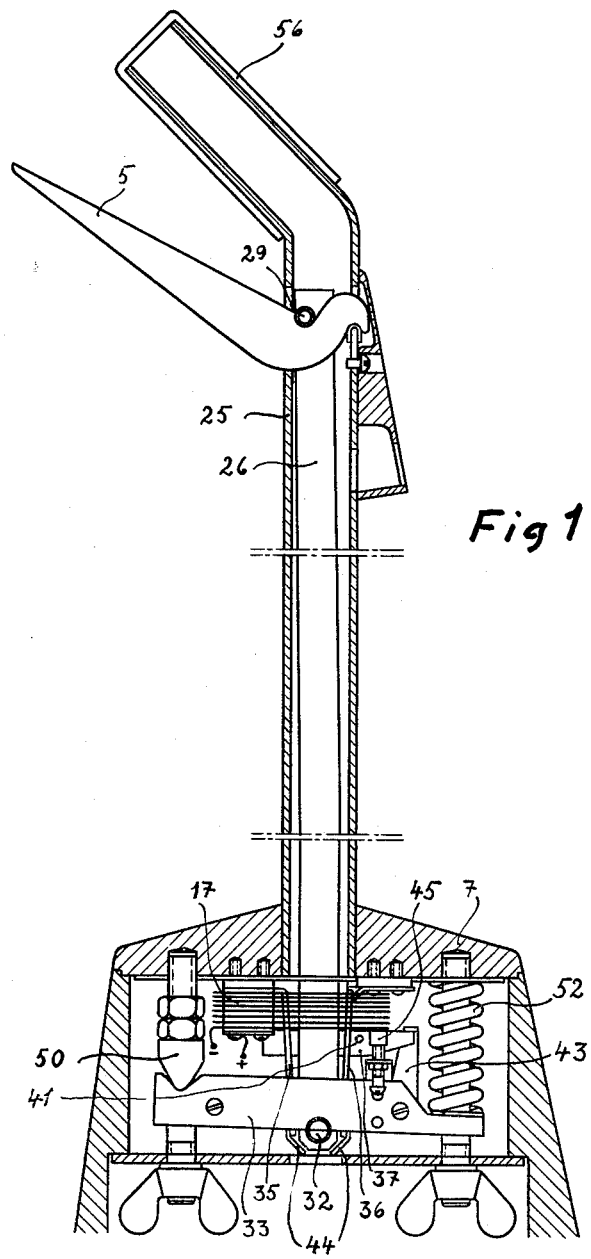
Figure 2:
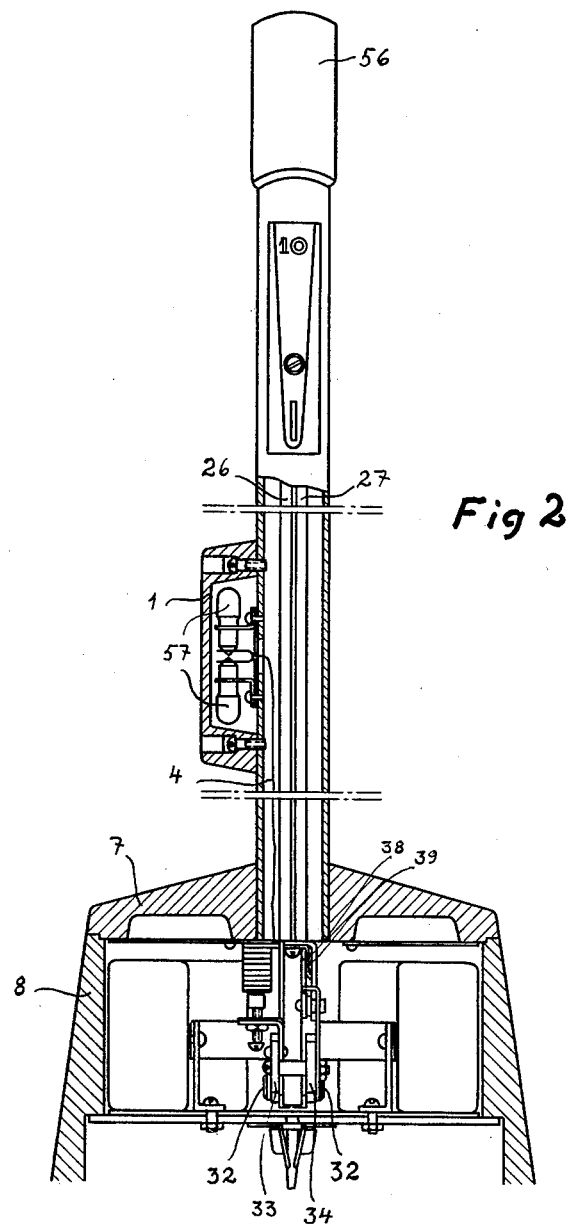

The invention will be described more in detail with reference to the attached drawings where FIGURE 1 is a cross-sectional side elevation of the arrangement, and FIGURE 2 is a cross-sectional front elevation of the arrangement.

As appears from FIGURE 1 the handle 56—5 of the arrangement consists of a stationary part 56, which is fastened to the shape or sleeve 25 of the arrangement, and movably arranged part 5, which inside the shape 25 is situated between two rulers or flat elongated plates 26 and 27 of some length and is resting on, on one hand a shaft 29, which keeps together the two rulers and on the other hand on a narrow opening in the shape 25. As will be described in the following the rulers 26—27 are held in a lowered position by a spring 52, and therefore the distance between the outer ends of the parts 5 and 65 normally is great. The part 56 is made of material which is isolating from electrical point of view.

The piece of the middle part is shaped with an opening for putting in a coin when using the force measuring device shown in the drawings marked 10, and has a marking organ 1—57. This organ has a transparent envelope 1 which encloses two lamps 57, one pole of which is connected to the shape 25 while the remaining pole is connected to one end of an insulated conductor 4. Between the handle 56—5 and the lower part there are arranged seven such marking organs, each with a separate conductor 4.

The shape 25, which combines the handle 56—5 and the lower part, has a length of about 70 cm. The lower part of the shape is fastened to a house 7—8 which encloses the movable parts of the force measuring device, see FIGURE 2. The lower ends of the rulers 26—27 have each a tap 32, which rests on a cylindrical recess about in the middle of one of two plane and parallel levers 33 and 34. These levers are integral parts of a lever arrangement 50—33—34—52—32, which in one of its ends consists of an edge 50, which is firmly fastened to the house 7—8 and against which one (the left) end of the levers 33 and 34 rests, while the other end of the lever arrangement is actuated downwards by a spring 52, the upper end of which is fastened to the part 7. The position of repose of the lever arrangement is determined by the resting points on the shape 25 of the movable handle part 5. A spring set 17 is fastened to the part 7. The free ends of these springs are located immediately above a pin 45 which is fastened to the lever arrangement. The springs are arranged in such a way that when the movably arranged part 5 of handle 56—5 is pressed towards the fixed part 56 with increasing hand-power the spring 52 is counteracted and overcome so that the pin 45 lifts the nearest spring which when the hand-power increases lifts the next spring and so on. These springs are via conductors 4 connected each to one of said marking organs 1—57, which thus can indicate the applied hand-power within some determined intervals. The spring at the bottom is connected to one pole of a battery for example —.

It is important that the force measuring device is arranged in such a way that it surely functions when a coin is put in and that this function occurs for a predetermined specie of coin. If the device is adjusted for "25 öre" then it must not function for "10 öre" and so on. The coin holder arrangement 35—36—37—43 arranged for this purpose will now be described in detail.

Two coin holders 35 and 36 are arranged nearby the lower ends of the rulers 26—27 in such a way that a coin falling down between the rulers is held in the space formed by the rulers 26—27 and the holders 35 and 36. Both these holders have in their free ends contact pieces 44 of good conducting material, for example copper. The coin is stopped by these contact pieces. The holder 35 is fixed and is connected with one pole on a battery, for example +. The holder 36 is fastened to a part 37, which can turn round an axle 41 and has one (the left) of its ends pressed between two brake blocks 38 and 39 fastened to the ruler 27. The middle position of the part 37 is determined by a stand still arrangement 43 fastened to the lever arrangement, the part 37 then resting against the upper, hook-like end of this arrangement 43. The holder 36 is in conducting connection with the remaining metallic parts of the device.

When a coin of the intended size is put in the coin score it falls down and remains lying against the contact pieces 44. When the handle part 5 is put towards the part 56 the whole lever arrangement is turned upwards. On account of friction between the part 37 and the brake blocks the part 37 will get a tendency to turn clockwise around the axis 41, that is the holder 36 will move closer to the holder 35, and therefore the deposited coin is firmly held so that good electric contact between these parts is received.

On further putting the part 5 towards the part 56 the free end of the bottom spring will by and by come into contact with the free end of the next spring. Then the following circuit will be closed: +, the holder 35, the coin, the holder 36, the shape 25, the lamps 57, the conductor 4, the two springs, —; that is the bottom marking organ lights up and gives a measure of the applied hand-power.

If this is increased still more the three lowest springs will come in contact with each other, and in the same way as earlier described the marking organs 1—57 located next lowest will light up and so on.

When the aplied hand-power after a force measurement is decreased the lever arrangement moves down and in this case the part 37 gets a tendency to move counter-clockwise, that is the holder 36 moves a distance from the holder 35 so that the coin can fall down. On the continued movement down of the lever arrangement the stand still arrangement 43 brings the holder 36 back to its initial position again and the force measuring device is ready for the next experimenting person.

Certainly many other modifications are within the invention idea. For example, it may be suitable to supply the marking organs with numerical indications which thus are succesively visible on a force measurement. Furthermore it is suitable to shape the measuring device so that it can be adjusted for different coin sizes. In the performance new described this is easily arranged with respect to the many possibilities for adjustments and revisions for the holders 35 and 36.

I claim:

1. A force measuring device for measuring the handpower of a person comprising an elongated housing, a movable handle at one end of said housing, parallel plates extending along said housing and connected to said handle for movement in response to said handle movement, a coin slot along said housing for receiving coins into the housing for travel between said plates toward the other end of said housing, cooperating holders at the other end of the housing for stopping the travel of an inserted coin and for providing an electrical connection through said coin for actuation of said device, one of said holders being movable in response to said plate movement whereby the movement of the connecting handle and plate in one direction will secure the coin in positive electrical connection and movement of the connecting handle and plate thereafter in the opposite direction will release the coin and return the holder to its initial cooperating stop position.

2. A force measuring device for measuring the hand-power of a person comprising an elongated housing, a pivoted handle mounted at one end of said housing, a pair of parallel plates extending along said housing and connected to said handle, spring set structure mounted at the other end of said housing, a coin slot along said housing for receiving coins into the housing for travel between said plates toward the other end of the housing, cooperating holders at the other end of the housing for stopping the travel of an inserted coin for providing an electrical connection through said coin for actuation of the device, said handle being connected for moving said plates in response to the movement of the handle, one of said holders being pivotally mounted and connected to said plates whereby movement of the handle in one direction will secure the coin in positive electrical connection, and movement thereafter of the handle in the other direction will release the coin and return the holders to their initial stopping position, successive light actuation structure and said spring sets being successively actuation means for the progressive movement of the handle in said one direction whereby when said coin is disposed in said holders to provide an electrical connection, the light actuation is operable.

3. A force measuring device for measuring the hand-power of a person comprising an elongated housing, movable handle means at one end of said housing, cooperating coin holders at the other end of said housing, elongated lever means extending along said housing and connected at one end to said handle means and at the other end to said coin holders, said lever means acting as a guide-way for receiving and guiding coins to said coin holders, and said handle means acting to move said coin holders by its connection to said lever means for retaining and releasing coins received in said coin holders.

References Cited in the file of this patent
UNITED STATES PATENTS
1,903,352     Ramsey _____ Apr. 4, 1933